United States Patent [19]
Rawdon

[11] 3,877,482
[45] Apr. 15, 1975

[54] FLOAT VALVE

[75] Inventor: Daniel J. Rawdon, New Hartford, Iowa

[73] Assignee: Hawkeye Steel Products, Inc., Waterloo, Iowa

[22] Filed: Oct. 17, 1973

[21] Appl. No.: 409,273

[52] U.S. Cl. ............... 137/446; 251/367; 137/451
[51] Int. Cl. .......................................... F16k 31/26
[58] Field of Search .......... 137/434, 436, 437, 441, 137/442, 443, 444, 445, 446, 451; 251/367

[56] References Cited
UNITED STATES PATENTS

| | | | |
|---|---|---|---|
| 1,212,056 | 1/1917 | Hill | 137/451 |
| 2,745,428 | 5/1956 | Stone et al. | 137/446 |
| 3,369,560 | 2/1968 | Young | 137/446 |
| 3,401,716 | 9/1968 | Gallogly | 137/451 X |
| 3,533,437 | 10/1970 | Young | 137/446 X |

FOREIGN PATENTS OR APPLICATIONS

| | | | |
|---|---|---|---|
| 412,059 | 6/1934 | United Kingdom | 137/451 |
| 768,447 | 10/1967 | Canada | 137/443 |
| 256,053 | 8/1963 | Australia | 137/443 |

Primary Examiner—Martin P. Schwadron
Assistant Examiner—David R. Matthews
Attorney, Agent, or Firm—Morton S. Adler

[57] ABSTRACT

A float valve is provided in the intake water line within a watering tank or the like so that the valve body is always disposed above the water line. Included is a housing having a valved outlet and a discharge port oriented downwardly relative to the tank with float operated mesh engaged double levers acting against a diaphragm associated with the outlet to open or close the intake flow at predetermined water levels. One of the levers is attached to the float arm and is laterally adjustable to provide for positioning the float for clearance relative to the tank walls if necessary. An independent fitting separate from but attachable to the housing is provided for initial attachment to the intake line free of the housing with the housing thereafter securable thereto with a keyed arrangement for proper orientation of the discharge port.

6 Claims, 5 Drawing Figures

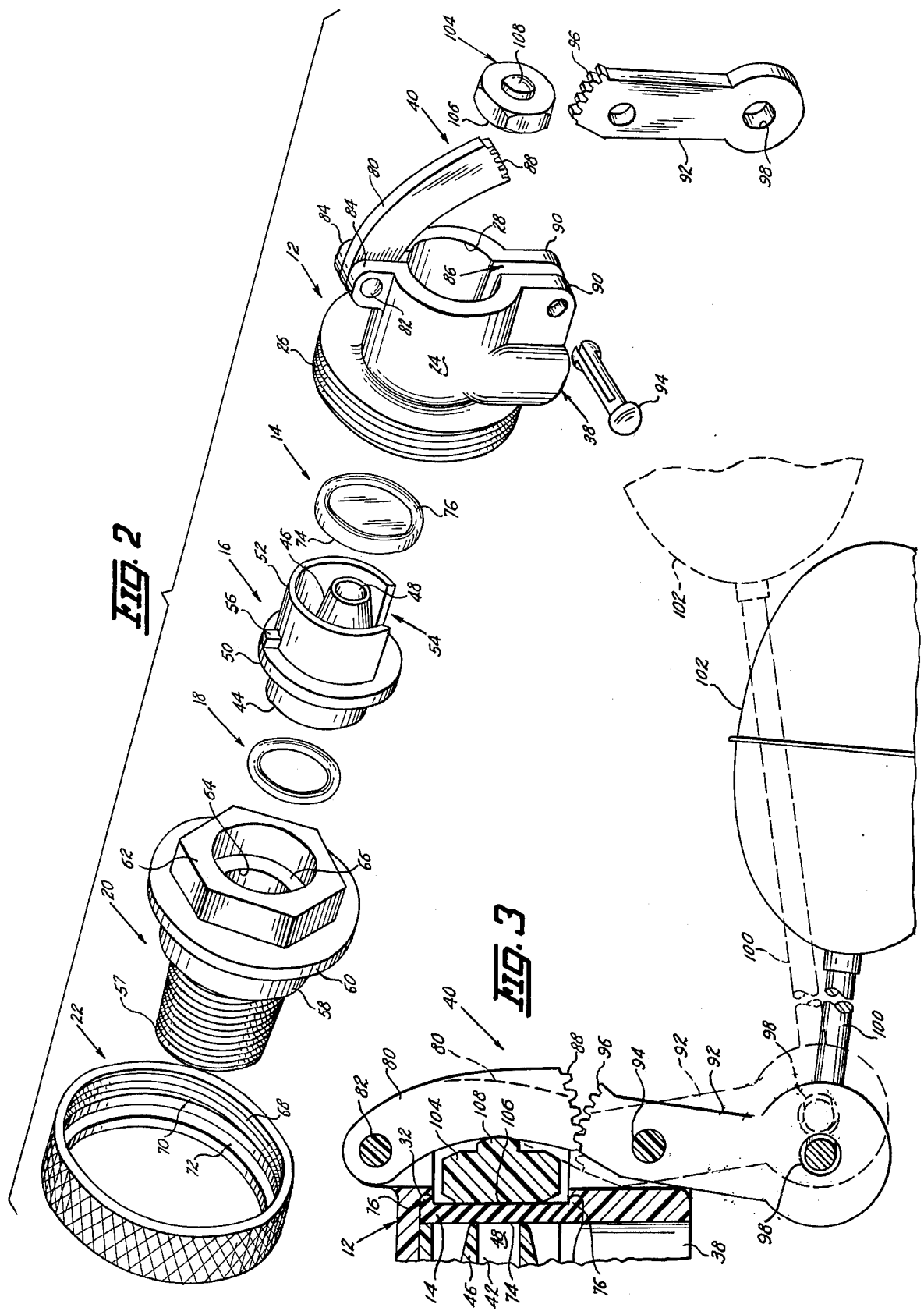

FLOAT VALVE

BACKGROUND OF THE INVENTION

This invention relates to improvements in float valves for watering tanks and the like.

The present valve utilizes a housing with a discharge port that is oriented toward the bottom of the tank or the like in which it is placed and while this is also true of other similar valves, it is noted that such other valves include as a part of the housing an integral threaded shank or neck for attachment to the water intake line. By reason of this arrangement, it is thus necessary to rotate the entire housing when attaching it to the intake line with the result that the required degree of tightening does not always leave the discharge port properly oriented. Consequently, to position the discharge port in the desired direction, either excessive or insufficient tightening may be required and, accordingly, one of the important objects of this invention is to provide a float valve assembly which includes a housing having a discharge port and an independent fitting separate from but attachable to the housing for initial attachment to a water intake line free of the housing.

Another object of this invention is to provide a float valve as characterized in which the valve body includes a directional discharge orifice keyed to the housing for proper alignment with the discharge port therein.

A further object herein is to provide a float valve of the above class which includes pivoting and endwise meshing levers actuated by a float arm for acting against a diaphragm engaging plug operatively associated with the discharge orifice to open and close the flow of water at predetermined water levels within the tank.

A still further object is to provide a float valve as described in which the flow closure means is constructed to prevent any back flow from the tank into the intake line.

Another object in a float valve of the above class is to provide for selective positioning of the float assembly to maintain the same free of contact with the side walls of the tank.

Other objects include a float valve mounted above the water level which permits all water in the housing to drain out when the valve is closed and, when the valve is open, causes all of the inflowing water to pass through the discharge port without the requirement for separate housing covers, shields or deflectors.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 2 is a perspective exploded view of this valve to show the several parts thereof, FIG. 3 is a cross sectional view taken from the line 3—3 of FIG. 1 showing the levers in matching mesh and with the solid lines of the levers indicating the open position of the valve and the broken lines thereof indicating their position when the valve is closed.

DESCRIPTION OF THE PREFERRED EMBODIMENTS

Figure 1:
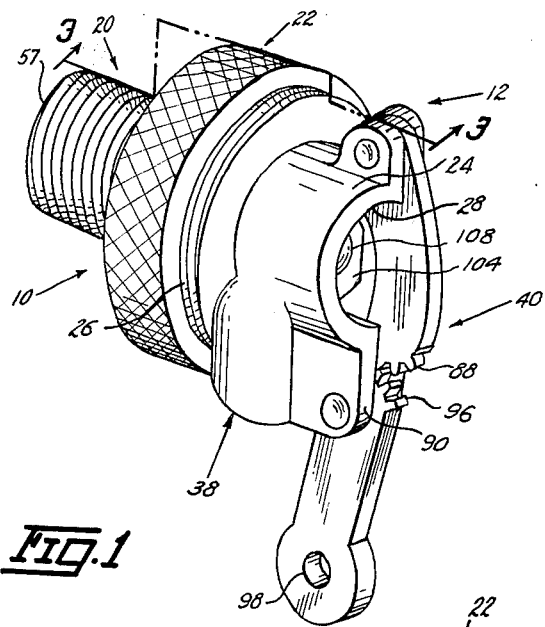
FIG. 1 is a perspective view showing a preferred embodiment of this invention.

Referring to the drawings, this new float valve is designated generally by the numeral 10 and, as best seen in FIG. 2, includes the general components of a housing or housing assembly 12, a flexible diaphragm 14, an orifice plug 16, an O-ring 18, a separate fitting 20 for attachment to a source of water supply and a collar 22 for coupling fitting 20 to the housing assembly 12 which are all more fully described as follows.

Figure 4:
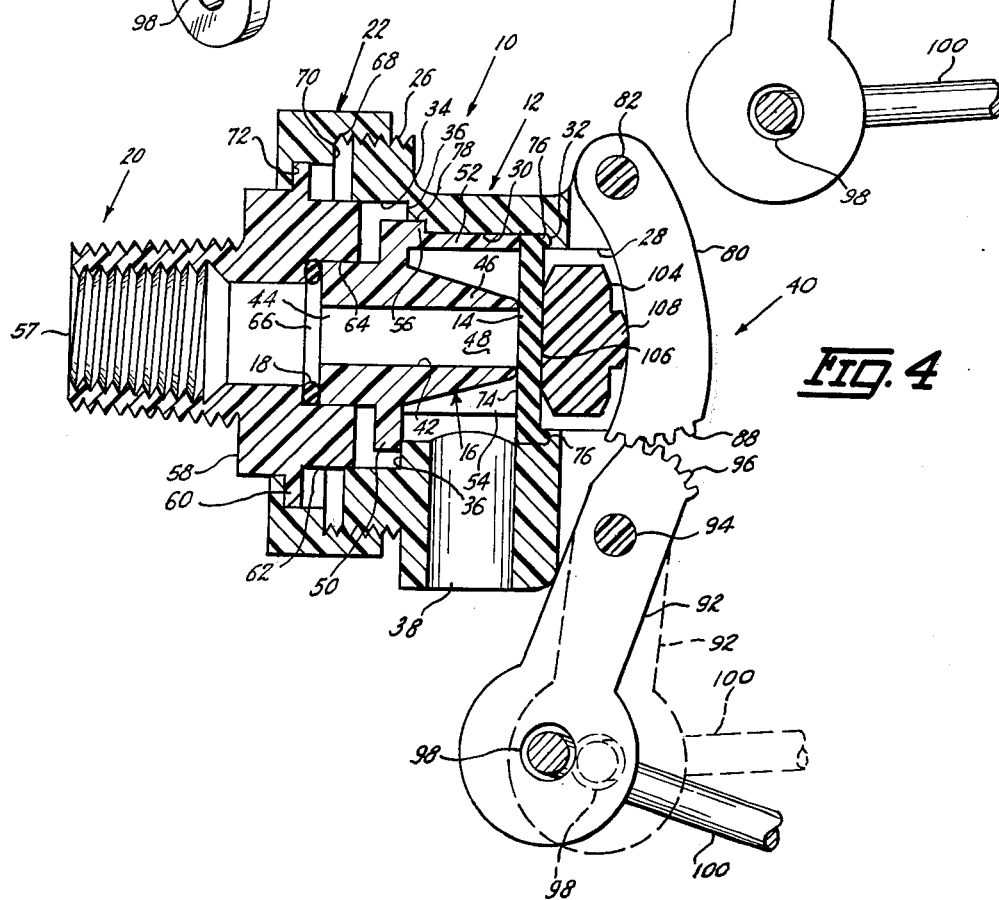
FIG. 4 is an enlarged cross sectional view of the valve in FIG. 1 showing corresponding positions of the levers and valve as in FIG. 3 but illustrating an offset tooth meshing engagement of the levers whereby the lateral swing of the lower lever is limited.

Housing assembly 12 includes a hollow and preferably cylindrical body 24 terminating at one end in a concentrically enlarged externally threaded flange 26 and the bore through body 24 is constructed to provide three chambers or compartments of different diameters as follows. A first chamber, recess or compartment 28 in body 24 has its outer end in communication with the end of housing 12 opposite to flange 26 and the inner end of chamber 28 communicates with a second chamber 30 that is concentrically enlarged and includes the grooved shoulder 32 between the two chambers as best seen in FIG. 4. Chamber 30 occupies generally the central portion of body 24 and merges into the concentrically enlarged third chamber 34 defined by shoulder 36, such chamber 34 being generally concentric with flange 26. An outlet or discharge port 38 in body 24 communicates with the second or central chamber 30 and in the practical use of valve 10, will be directionally oriented out of the bottom of housing 12 as shown. The lever assembly 40 on housing 12 will be later referred to in more detail relative to the operation of this valve following the description of the several other components.

The orifice plug 16 is provided with a through bore or water passageway 42 of a fixed diameter extending through a body portion that is cylindrical at the intake end 44 and tapered inwardly as at 46 toward the outlet end 48 in the form of a truncated cone. Encircling plug 16 somewhat inwardly of the intake end 44 is the shoulder or flange 50 and extending therefrom to a point planar with the outlet end 48 is the arcuate deflector shield 52 spaced concentrically from the tapered portion 46 and provided with the opening 54. On shield 52 at a point oppositely disposed to opening 54 there is a key or lug 56 abutted against shoulder 50 for purposes that will later appear.

Fitting 20, which is attachable to housing 12 as will be explained later in more detail, is nevertheless completely separable from such housing for purposes of independent attachment to a source of water supply (not shown). Such fitting 20 includes an externally threaded hollow shank 57 provided on one end with a concentrically enlarged shoulder 58 that terminates in the further concentrically enlarged flange 60. Extending from flange 60 is the integral concentrically reduced shoulder 62 which is preferably of a hex shape or the like to accommodate the application of a suitable tightening tool. The bore 64 within shoulder 62 is reduced relative to the bore through shank 57 to provide a seat 66 for O-ring 18.

Collar 22, which is used for securing housing 12 to fitting 20 as will appear, is provided with the internal threads 68 on one end for engagement with flange 26. Threads 68 terminate against shoulder 70 and the opening in collar 22 at the other end is reduced by the shoulder 72. Thus far described, the assembly of this valve is as follows.

Fitting 20 as a separate unit is independently attachable to a source of water supply and for this purpose, collar 22 is slipped over shank 57 and such shank can then be attached to any suitable fitting on the supply line. A wrench can be applied to the hex shoulder 62 in an obvious manner and fitting 20 can be tightened to the exact degree required without reference to or any requirement of the operating position of the housing 12 and particularly the discharge port 38. With fitting 20 thus attached to a water supply line (not shown), the assembly of the valve and its attachment to fitting 20 is as follows.

The flexible disc diaphragm 14, which has the flat side 74 and the lip-like edge 76 on the opposite side provided with a radius of approximately 180°, is passed through chamber 34 into chamber 30 so that edge 76 is seated in the grooved shoulder 32. Plug 16 is then inserted into housing 12 through chamber 34 and for this purpose, a recess or notch 78 (FIG. 4) in the top portion of shoulder 36 is provided with which lug 56 registers in a keyed engagement to assure that opening 54 in shield 52 will be in communication with the discharge port 38. The shoulder 50 of plug 16 will abut shoulder 36 in housing 12 whereby the orifice outlet 48 is in contact with diaphragm 14 and likewise, the extended end of shield 52 on plug 16 which is planar with outlet end 48 as described, will be in contact with diaphragm 14 to prevent its displacement from its seated position. With plug 16 in place and O-ring 18 on seat 66, the assembled housing 12 is introduced to fitting 20 so that inlet end 44 of plug 16 abuts the O-ring 18 and the outer face of shoulder 62 on fitting 20 will abut flange 50 on plug 16. In doing this, it will be appreciated that the discharge port 38 can readily be properly oriented without affecting the attachment of fitting 20 to the water source. In attaching collar 22 to flange 26, shoulder 72 on such collar will bear against flange 60 of fitting 20 whereby the tightening of collar 22 securely attaches fitting 20 in water tight communication with housing 12.

The lever assembly 40 previously referred to only generally is related to the valving control of outlet 48 as follows. A first or upper arcuate lever 80 is pivotally attached at its upper end by a pin 82 to a pair of spaced ears 84 on the outer top side of housing 12 above chamber 28. Lever 80 extends from ears 84 on a slight radius across chamber 28 and its other or lower end is movable into a slot 86 provided in the bottom of such chamber diametrically opposite ears 84. The edge of the lower end of lever 80 is serrated or toothed as at 88. A second pair of spaced ears 90 on the bottom of housing 12 form an elongation of slot 86 to pivotally receive the upper end of a lower lever 92 by means of a pin 94. The upper edge of lever 92 is serrated or notched as at 96 for meshing engagement with edge 88 on lever 80 as seen in FIG. 3. The lower end of lever 92 is provided with a transverse opening 98 or any other suitable means by which a float arm 100 can be secured, such arm 100 terminating in a suitable float bulb 102 or the like in a well known manner.

A pressure plug or plunger 104 is designed for removable placement in chamber 28 and has a generally flat side 106 for bearing against diaphragm 14 with the opposite side provided with the nipple or boss 108 for engagement by lever 80 as shown.

OPERATION

With valve 10 constructed and assembled as described, reference is first made to FIG. 3 where the levers 80 and 92 are in fully aligned mesh engagement at ends 88 and 96. With the levers thus engaged with each other, the inside edge of lever 80 is in contact with the nipple 108 on the pressure plug or plunger 104 and such plug is in juxtaposition with diaphragm 14 which in turn is positioned to effect a water tight seal against the outlet 48. The levers 80 and 92 while movable relative to each other on edges 88 and 96, are not normally detachable from each other without the disassembly of either or both of them. With a low water level in a tank in which valve 10 is used so that the float 102 is in a lowered position, such lowering of the float causes the lower end of lever 92 to swing to the left as viewed whereby the lower end of lever 80 is urged outwardly to release pressure on plug 104 and define the open or on position for water flow through outlet 48. This is represented by the solid lines in FIG. 3, and as float 102 rises, lever 92 pivots to the right which moves lever 80 against plug 104 that in turn impresses diaphragm 14 into water tight contact with outlet 48 and defines the closed position of levers 80 and 92 shown in broken lines in FIG. 3.

It will be noted that the relative position of the diaphragm 14 to the outlet 48 in the open position (FIGS. 3 and 4) and in the closed position (FIG. 5) does not indicate any conspicuous discernible difference and this is due to the fact that diaphragm 14 is either tightly impressed against such opening when the pressure is on plug 104 or is merely loosely in contact therewith when such pressure is relaxed. By this arrangement, when the valve is open, water under pressure passing through bore 42 of plug 16 is deflected at outlet 48 by diaphragm 14 into a spray pattern within the confines of shield 52 which directs it through opening 54 to the discharge port 38. Likewise, the normal proximity of diaphragm 14 to outlet 48 eliminates to a practical degree the possibility of any back flow from the tank supply (not shown) through bore 42. It should also be noted that in the normal installation of valve 10, it is mounted so as to always be above the contemplated water line and thus when the valve is closed, all water within the housing will drain out of the discharge port 38.

Figure 5:
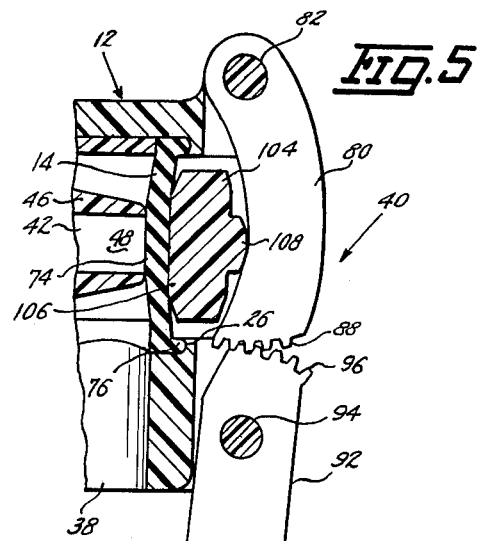
FIG. 5 is a cross sectional view of this valve similar to FIG. 3 but showing the lever meshing arrangement of FIG. 4 when the valve is in closed position.

With reference to FIGS. 4 and 5 where the construction and operation of valve 10 is the same as described above, I have shown a modified relationship of levers 80 and 92 to the extent that the toothed edges 88 and 96 are offset from the full alignment shown in FIG. 3. The effect of this arrangement is that the limit of the outward swing position of lever 92 in the closed position of the valve as seen in FIG. 5 and in the broken lines of FIG. 4 is less than the comparable position of the closed valve shown in the broken lines of FIG. 3. While the difference in such limits is not great, it does provide, if necessary, a limited adjustment whereby in a particular installation where a float 102 on an arm 100 of a fixed length may have insufficient clearance relative to the sidewall of a tank, the retracted position of lever 92 in FIGS. 4 and 5 can be used to advantage.

Accordingly, from all of the foregoing, it is thought a full understanding of the construction and operation of this invention will be had and the advantages of the same will be appreciated.

I claim:

1. A float valve comprising:
   a housing having a through bore defining a first pressure plug chamber at one end, a second central water chamber with a discharge port perpendicular to said bore and a third inlet chamber at the opposite end,
   said central chamber being of a larger diameter than said first chamber defined by a first shoulder intermediate the same and said third chamber being larger in diameter than said central chamber defined by a second shoulder intermediate the same,
   a flexible disc-shaped diaphragm in said central chamber seated on said first shoulder so as to close flow communication between said first and second chambers,
   an orifice plug having a body portion provided with a through bore defining an inlet end and an outlet end and an external flange on said body portion intermediate said ends,
   said orifice plug being journalled in said housing so that said outlet end is disposed within said central chamber in contact with said diaphragm and said flange is abutted against said second shoulder with said inlet end axially aligned with said third chamber,
   means on said orifice plug separate from said outlet end for engagement with said diaphragm to prevent the displacement of said diaphragm from its seated position,
   means to secure said housing to a source of water supply,
   a separate pressure plug member removably disposed in said first chamber in juxtaposition with said diaphragm and oppositely disposed to the outlet end of said orifice plug so as to be capable of impressing said diaphragm into water sealing engagement with said outlet end, and
   float actuated lever means operatively attached to said housing and movable into and out of engagement with said pressure plug whereby the respective upward and downward movement of said float acts on said lever means to respectively impart a pressure engagement therewith with said pressure plug against said diaphragm to define the close valving position of said diaphragm and to relax the pressure engagement with said pressure plug relative to said diaphragm to define the open valving position of said diaphragm.

2. A float valve as defined in claim 1 wherein said lever means comprises:
   first and second levers in longitudinal endwise alignment to each other,
   each of said levers being respectively pivotally secured at respective diametrically opposed points on said housing exteriorly of said pressure plug chamber with said first lever extending across the outer end of said pressure plug chamber in a position affording contact with said pressure plug,
   the respective endwise aligned edges of said levers being toothed and in locking meshing engagement with each other, and
   a float assembly operatively connected to said second lever whereby respective upwardly and downwardly movements of said float assembly act on said levers to respectively move said first lever into contact with said pressure plug to define the closed position of said valve and to relax the contact of said first lever on said pressure plug to define the open position of said valve.

3. A float valve as defined in claim 1 including:
   the body portion of said orifice plug being cylindrical from said inlet end to the flange thereon and being tapered inwardly from said flange to said outlet end,
   an arcuate shield on said orifice plug extending from the flange thereon to a point planar with said outlet end and in concentric spaced relationship about said tapered body portion,
   said shield being provided with an opening,
   said shield serving as the means on said orifice plug for engaging said diaphragm to prevent the displacement thereof from its seated position,
   the arrangement of said orifice plug to said diaphragm being such that said diaphragm is tightly impressed against said outlet end and said shield in closed position and loosely in contact therewith in open position whereby in open position, the possibility of back flow into said water chamber is eliminated for all practical purposes,
   a lug on said orifice plug for a keyed engagement with said recess, and
   said recess and said lug being so positioned that the keyed engagement of the same orients the opening in said shield in flow communication with said discharge port.

4. A float valve as defined in claim 1 wherein the means to secure said housing to a source of water supply comprises:
   a separate and independent fitting having a through bore and adapted at one end for attachment to a water supply line,
   the bore at the other end of said fitting being reduced in diameter to provide a recess terminating in an annular shoulder,
   an external flange on said fitting intermediate the ends thereof,
   an O-ring on said shoulder,
   an externally threaded flange on said housing concentric with the third chamber therein,
   said other end of said fitting being disposed in said third chamber so that the inlet end of said orifice plug is journalled in the recess thereof in abutment with said O-ring, and
   an internally threaded collar arranged on said fitting so as to engage said external flange and to threadably engage the flange on said housing for securely attaching said fitting and said housing in water sealing engagement.

5. A float valve as defined in claim 1 including:
   the toothed edges of said levers being selectively engageable in full complementary mesh relationship and in a position offset from complementary relationship,
   the full mesh relationship permitting the float attached end of said second lever to move between predetermined limits, and
   the offset meshing relationship acting to reduce the limits of movement of said second lever.

6. A float valve as defined in claim 1 including:
said first shoulder being provided with an annular groove,
said diaphragm having one flat side and a peripheral lip on the opposite side, and
said diaphragm being positioned in said central chamber so that said lip is seated in said groove and said flat side is oriented toward said orifice plug.

* * * * *